United States Patent
Ueyama

(10) Patent No.: US 8,757,860 B2
(45) Date of Patent: Jun. 24, 2014

(54) BACKLIGHT DEVICE, LIQUID CRYSTAL DISPLAY DEVICE AND TELEVISION RECEIVER

(75) Inventor: Munetoshi Ueyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/576,356

(22) PCT Filed: Jan. 18, 2011

(86) PCT No.: PCT/JP2011/050701
§ 371 (c)(1),
(2), (4) Date: Jul. 31, 2012

(87) PCT Pub. No.: WO2011/099328
PCT Pub. Date: Aug. 18, 2011

(65) Prior Publication Data
US 2012/0293721 A1  Nov. 22, 2012

(30) Foreign Application Priority Data
Feb. 10, 2010 (JP) .................................. 2010-027662

(51) Int. Cl.
*F21V 7/04* (2006.01)
*G02F 1/1335* (2006.01)

(52) U.S. Cl.
CPC ............ G02B 6/0068 (2013.01); G02B 6/0073 (2013.01); G02B 6/0083 (2013.01); G02B 6/0091 (2013.01); *G02F 1/133608* (2013.01)
USPC ......................................... 362/612; 362/613

(58) Field of Classification Search
CPC .... G02B 6/002; G02B 6/0068; G02B 6/0073; G02B 6/0081; G02B 6/0083; G02B 6/0086; G02B 6/009; G02B 6/0091; G02F 1/133603; H01L 2224/49105; H01L 2224/49107; H05K 3/3452; H05K 3/3463; H05K 3/3478
USPC .............. 362/97.3, 249.06, 249.08, 602, 612, 362/613, 632, 633
See application file for complete search history.

(56) References Cited

U.S. PATENT DOCUMENTS

| | | | |
|---|---|---|---|
| 6,913,366 B2 * | 7/2005 | Lee | 362/612 |
| 7,350,955 B2 * | 4/2008 | Chang et al. | 362/612 |
| 2003/0147257 A1 | 8/2003 | Lee | |
| 2008/0084691 A1 * | 4/2008 | Liu et al. | 362/613 |
| 2008/0106912 A1 * | 5/2008 | Yeom | 362/613 |
| 2008/0170177 A1 * | 7/2008 | Chen | 362/612 |
| 2011/0025730 A1 | 2/2011 | Ajichi | |

FOREIGN PATENT DOCUMENTS

| | | |
|---|---|---|
| JP | 2003-281917 A | 10/2003 |
| JP | 2004-177890 A | 6/2004 |
| JP | 2008-258094 A | 10/2008 |
| WO | 2009/144853 A1 | 12/2009 |

* cited by examiner

*Primary Examiner* — Y M Lee
(74) *Attorney, Agent, or Firm* — Chen Yoshimura LLP

(57) ABSTRACT

Disclosed are a side light-type backlight device with high brightness and excellent light use efficiency, a liquid crystal display device and a television receiver. The disclosed backlight device has a light guide plate that emits, from the top surface, light that entered from the side surface thereof, a substrate that is disposed at the side surface of the light guide plate and that has a plurality of LEDs emitting light from the top aligned thereon, and an outer case enclosing the light guide plate and the substrate. Of the plurality of LEDs, the end LEDs are provided with inclined sections such that the illumination direction of said end LEDs intersect with that of the other LEDs.

3 Claims, 10 Drawing Sheets

BACKLIGHT DEVICE, LIQUID CRYSTAL DISPLAY DEVICE AND TELEVISION RECEIVER

TECHNICAL FIELD

The present invention relates to a side-lighting type backlight device that includes an LED light source and a light guide plate, a liquid crystal display device, and a television receiver.

BACKGROUND ART

Conventional backlight devices that are used for liquid crystal display devices include a side-lighting type backlight device in which a light source is disposed so as to face the side surface of a light guide plate, a direct-lighting type backlight device in which a light source is disposed directly below a liquid crystal panel, and the like. The side-lighting type backlight device is used for small and medium-sized liquid crystal display devices and liquid crystal display devices that require thin-profile, in particular. The direct-lighting type backlight device is used for large monitors, televisions, and the like. In the past, the light source of these backlight devices was mainly made of cold-cathode fluorescent lamps (CCFL), but recently, in view of environmental issues, the CCFLs have been replaced by LEDs that use less power and contain no mercury.

Patent Document 1 shown in FIG. 8 is an example of the side-lighting type backlight device that uses LEDs as the light source thereof. Patent Document 1 describes a side-lighting type backlight device that has a plurality of light sources, in which four chip-type LEDs 9a to 9d, for example, are provided on a light incident surface 71 of a light guide plate 7. In light source facing portions of the light incident surface 71 (preferably two ends of the light incident surface 71), which face at least the chip-type LEDs 9a and 9d at the opposite ends, inclined surfaces 7a and 7b are formed, and with these inclined surfaces 7a and 7b, the chip-type LEDs 9a and 9d are disposed such that optical axes L1 and L2 thereof are directed toward the center of the light guide plate 7. In Patent Document 1, with this configuration, light emitted from the respective light sources are distributed uniformly in the entire light guide plate, thereby providing the illuminating light with enhanced uniformity to a liquid crystal display element.

Structures and types of a typical chip-type LED are explained with reference to FIG. 9. A chip-type LED 9 includes a semiconductor light-emitting element (not shown) that has an n-type semiconductor layer, a p-type semiconductor layer, and an active layer sandwiched therebetween and that is packaged in a package 15 and connecting terminals 16 (anode and cathode) that are used to connect the semiconductor light-emitting element to a circuit board, thereby supplying power, for example. Further, the package 15 has a light-emitting surface 14 where a lens that adjusts directional characteristics of illuminating light is provided. The chip-type LEDs are categorized into two types, a top-emitting type and a side-emitting type, depending on where the light-emitting surface 14 is located with respect to the package 15.

In the top-emitting type (top view type) shown in FIG. 9(a), the light-emitting surface 14 is provided on the top surface of the package 15, and light is emitted in a direction perpendicular to a mounting surface 91 that faces the connecting terminals 16. The top-emitting type LED 9 has advantages such as higher brightness and longer life. Also, because the illumination direction is perpendicular to the mounting surface 91, this type is mainly used for the direct-lighting type backlight device. Specifically, by disposing a substrate having the chip-type LED 9 mounted thereon below the bottom surface of the light guide plate 7 such that the mounting surface 91 becomes parallel with the light guide plate 7, the light-emitting surface 14 of the chip-type LED 9 faces the light incident surface, which is the bottom surface, of the light guide plate 7.

On the other hand, in the side-emitting type (side view type) shown in FIG. 9(b), the light-emitting surface 14 is provided on the side surface of the package 15, and light is emitted in a direction parallel with the mounting surface 91. Because Patent Document 1 and conventional side-lighting type backlight devices are configured such that light is emitted to the light incident surface 71 that is provided on the side surface of the light guide plate 7, this side-emitting type LED 9 is employed therein. Specifically, by disposing a substrate having the side-emitting type LED 9 mounted thereon near the side surface of the light guide plate 7 such that the mounting surface 91 becomes parallel with the light guide plate 7, the light-emitting surface 14 of the chip-type LED 9 faces the light incident surface provided on the side surface of the light guide plate 7. With this side-emitting type LED 9, when improving the uniformity of the illuminating light in the manner described in Patent Document 1 shown in FIG. 8, the light-emitting surfaces of the LEDs 9 can be easily arranged so as to face the inclined surfaces 7a and 7b of the light emitting surface 71 by turning the LEDs 9 horizontally on the substrate.

RELATED ART DOCUMENT

Patent Document

Patent Document 1: Japanese Patent Application Laid-Open Publication No. 2004-177890

Problems to be Solved by the Invention

However, because the side-emitting type LEDs 9 has lower brightness and shorter life as compared with the top-emitting type LEDs, the backlight device in Patent Document 1 and conventional side-lighting type backlight devices that typically employed the side-emitting type LEDs had a problem in terms of brightness and reliability. On the other hand, the top-emitting type LED 9 has higher brightness and longer life, however, it is difficult to adjust the illumination direction relative to the light guide plate 7, and therefore, when the top-emitting type LED was used in the side-lighting type backlight device, it was not possible to achieve the uniform illuminating light.

SUMMARY OF THE INVENTION

Means for Solving the Problems

A backlight device according to the present invention includes a light guide plate that emits, from a top surface, light that entered from a side surface, a substrate that is disposed on a side surface of the light guide plate and that has a plurality of top-emitting type LEDs arranged thereon, and an outer case that encloses the light guide plate and the substrate, wherein, of the plurality of LEDs, an LED at an end is provided with a tilting portion such that an illumination direction thereof intersect with that of other LEDs.

Effects of the Invention

Because a top-emitting type LED that has high brightness and long life is used for the backlight device, and because the illumination direction of the LED at the end is made to intersect with that of other LEDs by the tilting portion, light emitted from the plurality of LEDs can be distributed efficiently over the entire light guide plate, thereby improving the brightness of the illuminating light for a liquid crystal panel.

DETAILED DESCRIPTION OF EMBODIMENTS

Below, preferred embodiments of a backlight device of the present invention and a liquid crystal display device using the same will be explained with reference to figures. In the descriptions below, an example in which the present invention is applied to a transmissive liquid crystal display device will be explained.

Embodiment 1

Figure 1:
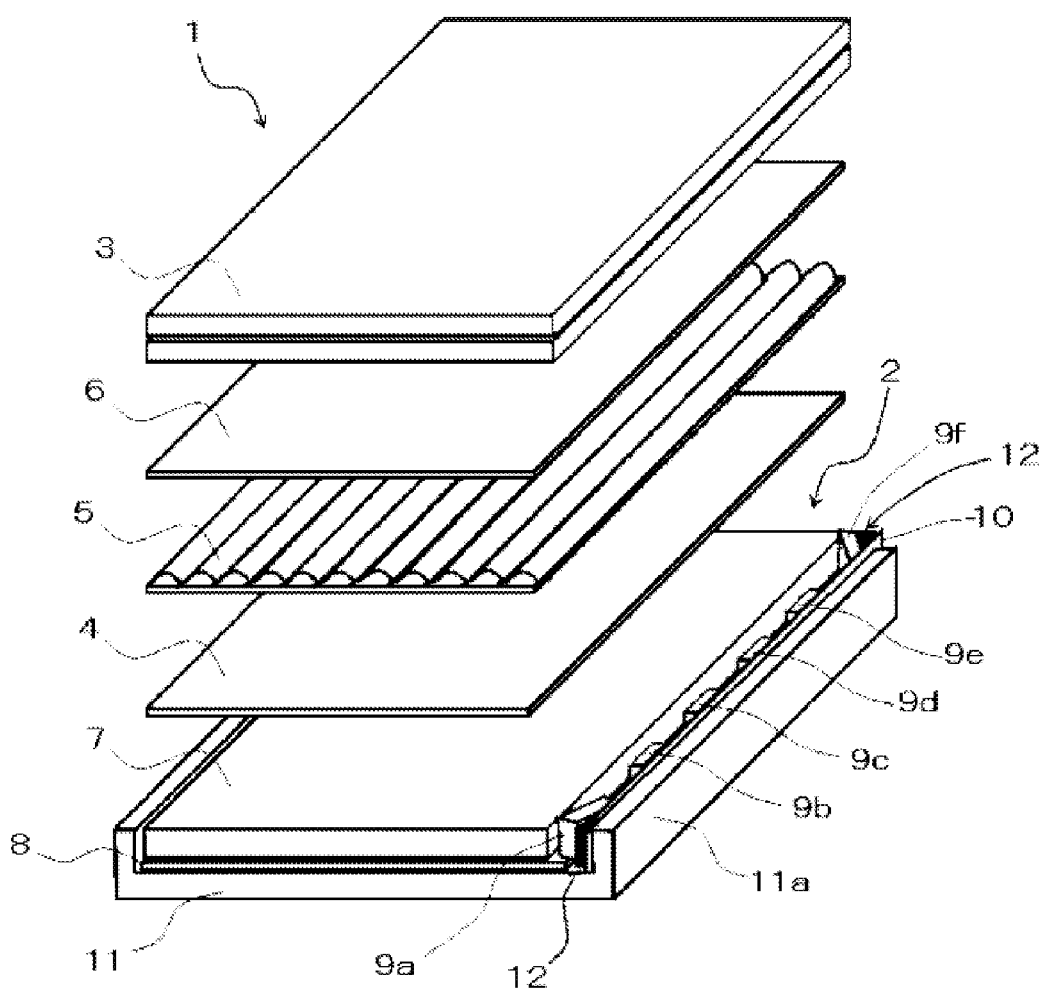
FIG. 1 is a perspective view for illustrating a backlight device and a liquid crystal display device according to Embodiment 1.

FIG. 1 is a perspective view for illustrating a backlight device and a liquid crystal display device according to Embodiment 1 of the present invention. As shown in FIG. 1, in a liquid crystal display device 1, a backlight device 2 and a liquid crystal panel 3 that receives light emitted from the backlight device 2 are formed as a single unit, thereby constituting the transmissive liquid crystal display device 1. The liquid crystal display device 1 also includes a diffusion sheet 4, a prism sheet 5, and a polarizing sheet 6 disposed between the backlight device 2 and the liquid crystal panel 3, for example, and with these optical sheets, the brightness of the light emitted from the backlight device 2 is made uniform, which improves the display performance of the liquid crystal panel 3.

The backlight device 2 is a side-lighting type backlight device in which light sources are provided on the side surface of a light guide plate 7, and uses a plurality of top-emitting type LEDs 9 as the light source. When comparing the optical characteristics and electric characteristics of the top-emitting type LED 9 with those of side-emitting type LEDs, the average luminance is 20% higher, and the average life is 30% longer in the top-emitting type LED 9 under the same operation conditions. Also, the light illumination direction is a direction perpendicular to the mounting surface 91. The actual illuminating light spreads in a prescribed manner (directional characteristics) from the center axis, which is the illumination direction.

Figure 2:
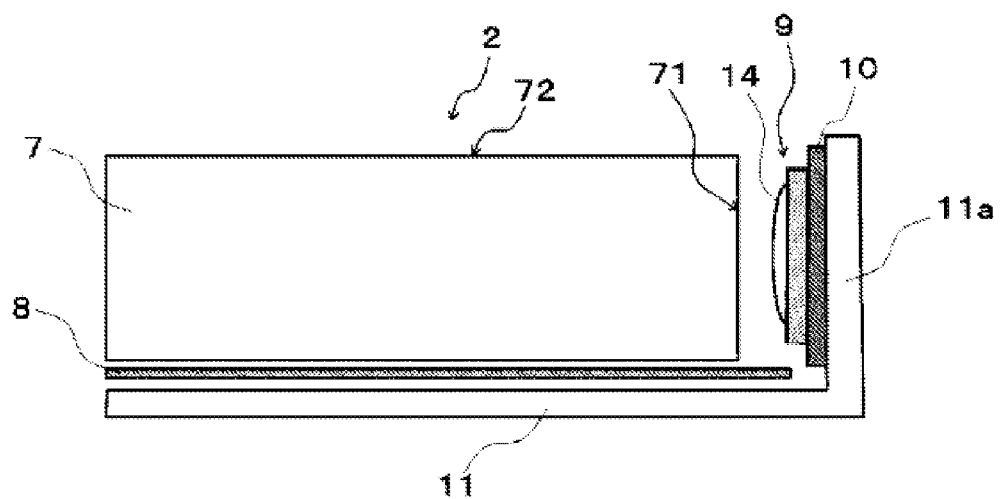
FIG. 2 is an enlarged cross-sectional view for illustrating a configuration of a principal portion of the backlight device of Embodiment 1.

FIG. 2 is a cross-sectional view of the backlight device 2 of the present invention. The light guide plate 7 is formed in a rectangular shape by using a synthetic resin such as a transparent acrylic resin as a material, for example. A prescribed side surface thereof is a light incident surface 71, and the top surface is a light emerging surface 72. Below the light guide plate 7, a reflective sheet 8 is disposed so as to efficiently reflect light from the light source toward the liquid crystal panel provided above.

As shown in FIGS. 1 and 2, the top-emitting type LED 9 is mounted on a circuit board 10, and is attached to a side wall surface 11a that is an end portion of an outer case (back bezel) 11 of the backlight device 2 folded upwardly at a right angle. The top-emitting type LED 9 is disposed such that the light-emitting surface 14 thereof faces the light incident surface 71 of the light guide plate 7.

Figure 3:
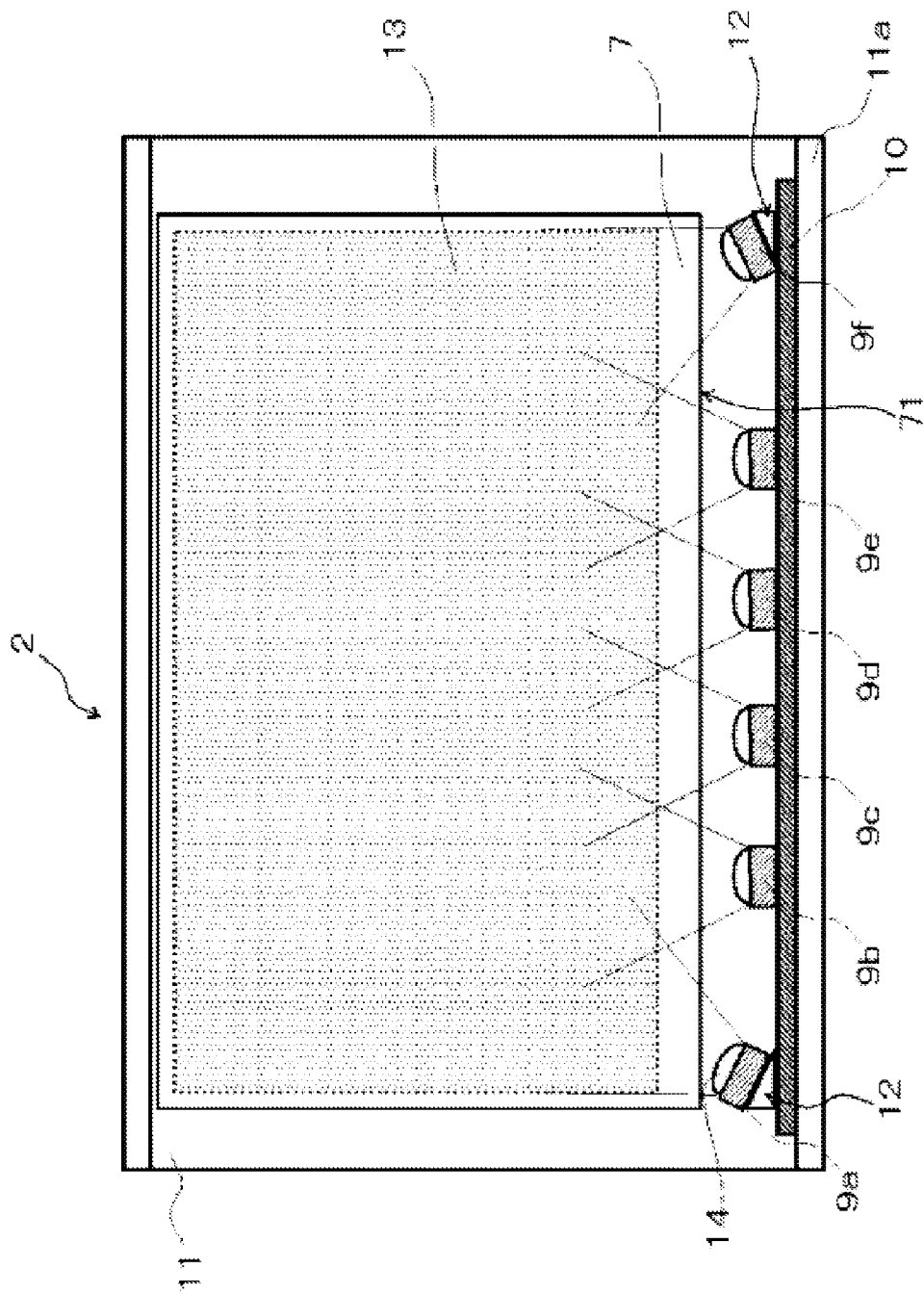
FIG. 3 is a plan view for illustrating a configuration of a principal portion of the backlight device of Embodiment 1.

FIG. 3 is a plan view of the backlight device 2 of the present invention. As shown in FIGS. 1 to 3, of a plurality (9a to 9f) of top-emitting type LEDs 9, LEDs 9a and 9f at the ends are provided with tilting portions 12 that make the light-emitting surfaces 14 inclined such that the illumination direction intersects with that of other LEDs 9b to 9e.

As shown in FIG. 3, the LEDs 9a and 9f at the ends are provided with tilting portions 12 between the mounting surface 91 of the LEDs 9 and the respective circuit boards 10, for example, and the respective light-emitting surfaces 14 of the LEDs 9 are thereby inclined inwardly relative to the light guide plate 7. Thus, the LEDs 9 are disposed such that the illumination direction of the LED 9a at the end, for example, intersects with the illumination direction of the LED 9b adjacent thereto.

By providing the tilting portion 12 in the manner described above, the illumination direction of the LED 9a at the end can be adjusted such that the entire light beam emitted therefrom, which spreads in a prescribed manner, is incident on the light guide plate 7. Thus, at the end of the illumination area 13, the illuminating light beams from the LED 9a and from the LED 9b are efficiently combined, thereby achieving uniform illumination.

FIGS. 4(a) to 4(e) are enlarged cross-sectional views showing examples of specific configurations of the tilting portions 12. The tilt angle of the tilting portion 12 is appropriately set by taking into account the directional characteristics of the top-emitting type LED 9, uneven brightness in the display region 13, and the like.

Figure 4A:
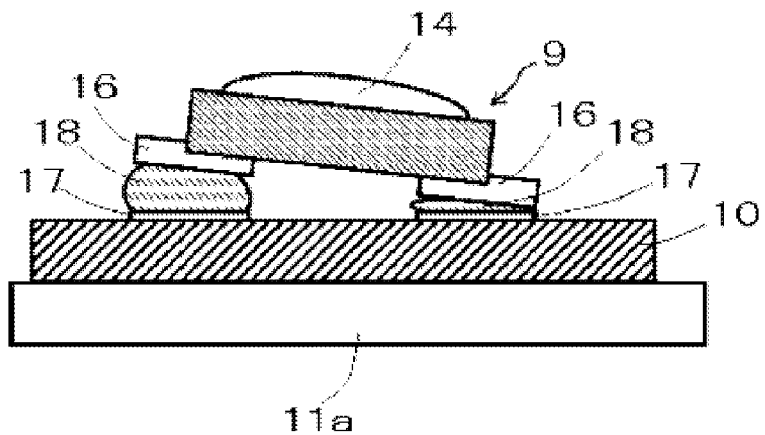
FIG. 4a is an enlarged cross-sectional view for illustrating a tilting portion of a chip-type LED of Embodiment 1.
Figure 4B:
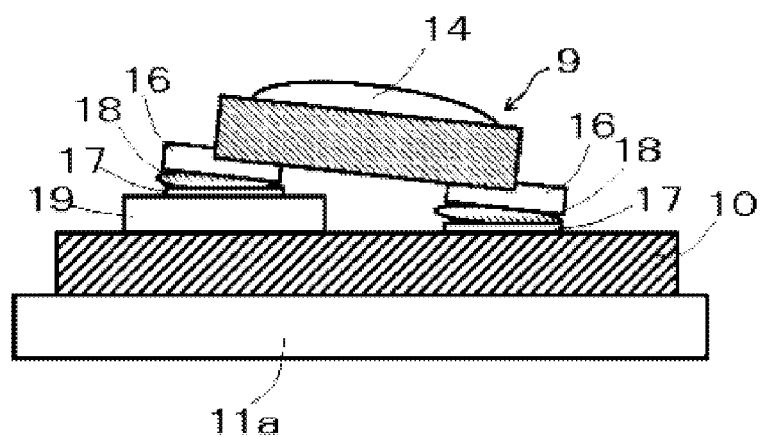
FIG. 4b is an enlarged cross-sectional view for illustrating a tilting portion of a chip-type LED of Embodiment 1.
Figure 4C:
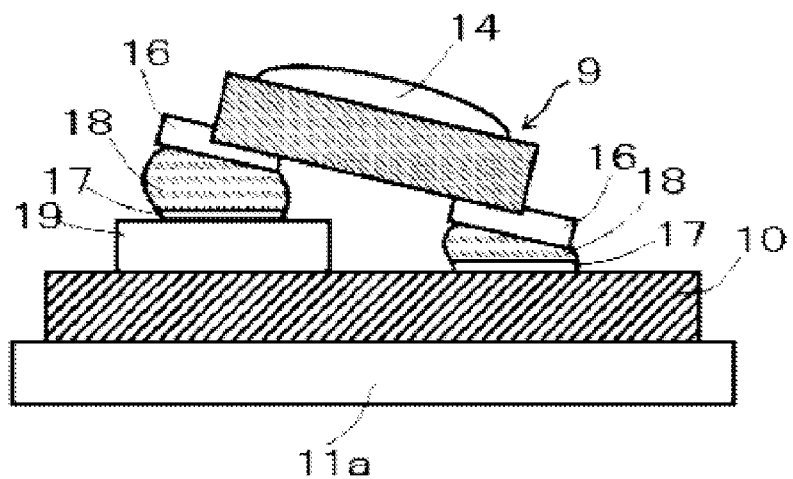
FIG. 4c is an enlarged cross-sectional view for illustrating a tilting portion of a chip-type LED of Embodiment 1.
Figure 4D:
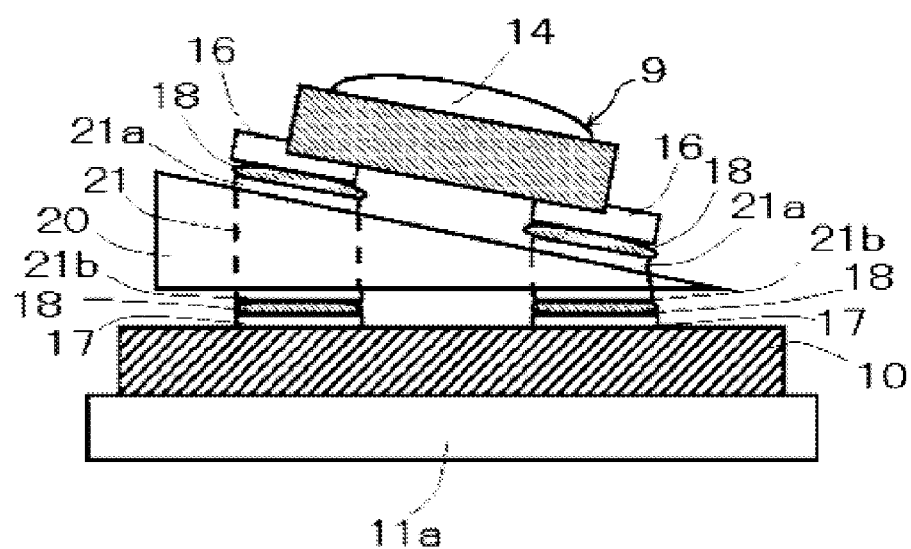
FIG. 4d is an enlarged cross-sectional view for illustrating a tilting portion of a chip-type LED of Embodiment 1.

The tilting portion 12 shown in FIG. 4(a) is formed by using different amounts of solder 18 between the two terminals (anode and cathode) in connecting the top-emitting type LED 9 to the circuit board 10 by the solder 18. If the LED 9 has a strong directivity, and the emitted light thereof travels straight, for example, even when the tilt angle of the tilting portion 12 is small, the entire emitted light beam can be radiated to the display region 13 efficiently. When the tilt angle is small as described, by using a larger amount of the solder 18 in the anode side as compared with the cathode side in connecting the connecting terminals 16 of the LED 9 to the connecting terminals 17 of the circuit board 10, for example, the chip-type LED 9 can be made declined from the anode side to the cathode side, and the tilting portion 12 can be formed in a simple manner.

In the tilting portion 12 shown in FIG. 4(*b*), the LED 9 is inclined by placing one of the two terminals of anode and cathode on a protrusion 19 that is formed on the circuit board 10 in connecting the terminal. The protrusion 19 is provided under the connecting terminal 17 of the circuit board 10, which is connected to one of the two connecting terminals (anode and cathode) 16 of the LED 9, and is made of laminated layers that constitute the circuit board 10 such as a wiring layer (metal material) and an insulating layer (resin material). With the tilting portion 12 using the protrusion 19, because the height of the protrusion 19 can be adjusted by the total thickness of the layers such as the wiring layer and the insulating layer, the tilt angle of the tilting portion 12 can be set in a quantitative manner.

In the tilting portion 12 shown in FIG. 4(*c*), the LED 9 is inclined by combining the tilting portion 12 formed by the solder 18 and the tilting portion 12 formed by the protrusion 19. The tilting portion 12 formed by combining the solder 18 and the protrusion 19 makes possible a larger tilt angle than a tilting portion that uses the solder 18 alone or the protrusion 19 alone.

In the tilting portion 12 shown in FIG. 4(*d*), the LED 9 is inclined along an inclination of a relay terminal 20 that is disposed between the circuit board 10 and the LED 9. The relay terminal 20 is formed so as to have an inclined surface on the top surface, and includes a package made of a resin material, for example, and conductors 21 that are provided inside the package and that allow electricity to flow in the vertical direction. The end surfaces of the conductors 21 are respectively exposed from the inclined surface on the top and from the bottom surface, thereby providing connecting terminals 21*a* and 21*b*. By using this relay terminal 20, and by connecting the connecting terminals 21*a* and 21*b* that are respectively exposed from the top surface and the bottom surface of the package to the connecting terminals 17 of the circuit board 10 and to the connecting terminals 16 of the LED 9, the LED 9 can be made inclined along the inclined top surface of the relay terminal 20.

In the titling portion 12 using the relay terminal 20, the tilt angle is set by the inclined shape of the package, and therefore, the inclination of the chip-type LED 9 can be set with a greater degree of freedom. Also, the inclination direction of the inclined surface can be freely set by the inclination direction of the package of the relay terminal 20, regardless of the direction in which the two terminals (anode and cathode) in the chip-type LED 9 are connected.

In Embodiment 1 of the present invention, the plurality of top-emitting type LEDs 9 that have higher luminance and longer life are used as the light source of the backlight device 2, and by providing the tilting portion 12 between the mounting surface 91 and the circuit board 10 of the LED 9 at the end, the illumination direction of the LED at the end can be made to interest with the illumination direction of other LEDs, which allows the light emitted from the plurality of chip-type LEDs 9*a* to 9*f* to be distributed efficiently over the entire light guide plate. Therefore, in the backlight device of the present invention, the brightness of the light that illuminates the liquid crystal panel 3 can be made uniform, and the uneven brightness can be eliminated, thereby improving the brightness. Also, by using the backlight device of the present invention, a liquid crystal display device with excellent display quality can be provided.

Embodiment 2

Figure 5:
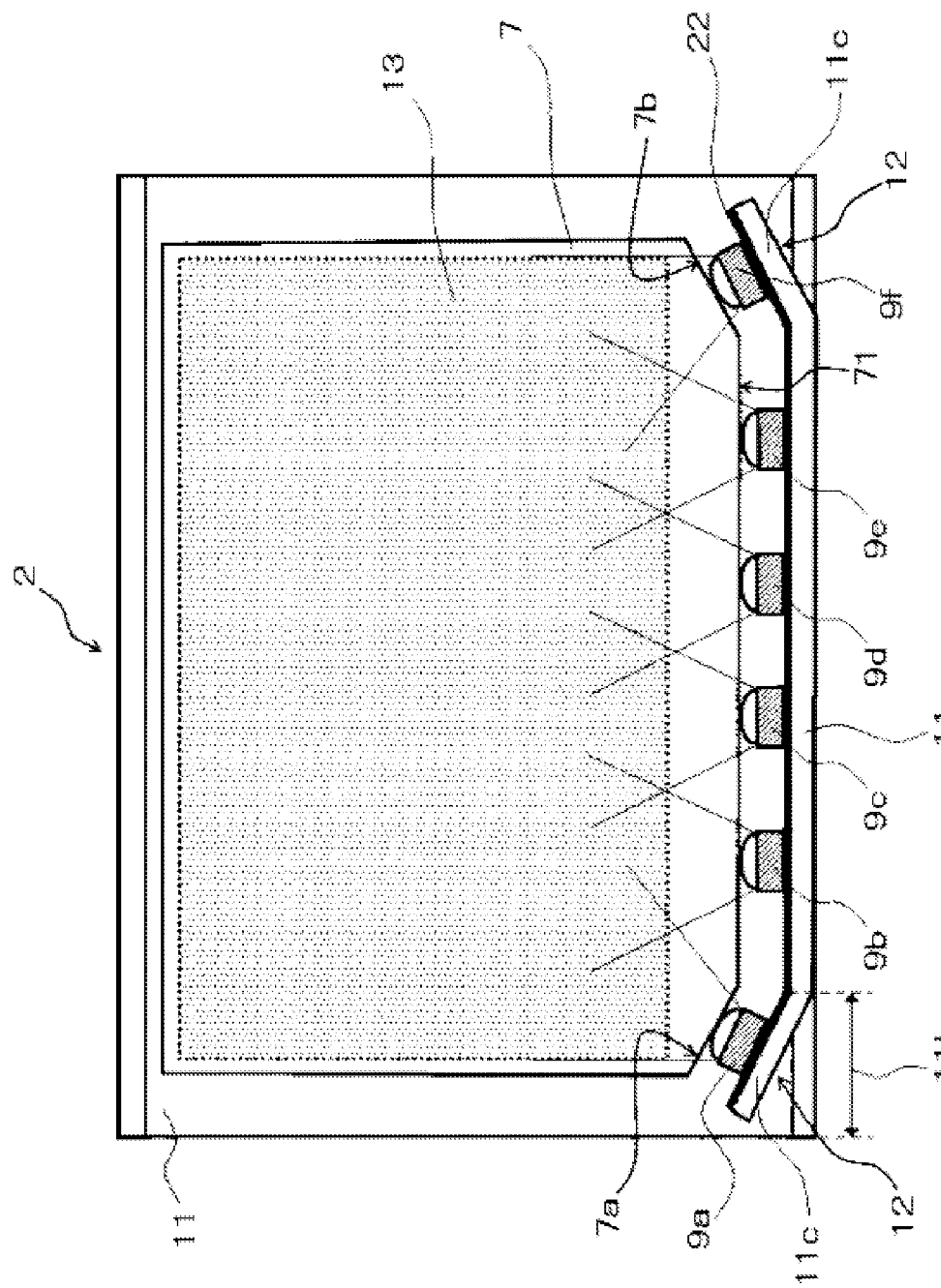
FIG. 5 is a plan view for illustrating a configuration of a principal portion of a backlight device according to Embodiment 2.

FIG. 5 is a plan view of the backlight device 2 according to Embodiment 2 of the present invention. This embodiment differs from Embodiment 1 above in a configuration of the tilting portion 12, and because other configurations may be the same as those of Embodiment 1 above, the detailed descriptions thereof are omitted.

In Embodiment 2, as shown in FIG. 5, one end of an outer case (back bezel) 11 of the backlight device 2 is folded toward the light incident surface 71 of the light guide plate 7 at a right angle so as to form a side wall surface 11*a*. Further, incisions 11*b* are made from the outside to respective end portions of the side wall surface 11*a* where the LEDs 9*a* and 9*f* are disposed, and the portions of the side wall surface 11*a* with the incisions are bent inwardly toward the light guide plate 7 at a prescribed angle, thereby forming bent portions 11*c*. The tilting portions 12 are provided in this way.

Figure 6:
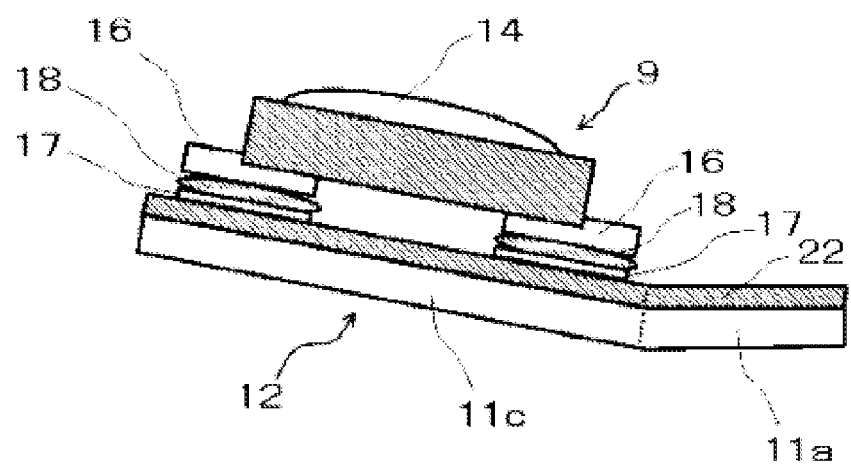
FIG. 6 is an enlarged cross-sectional view for illustrating a tilting portion of a chip-type LED according to Embodiment 2.

FIG. 6 is an enlarged cross-sectional view showing an example of the configuration of the tilting portion 12 according to Embodiment 2. As described above, the tilting portion 12 is provided by bending sections of the side wall surface 11*a*, in which the LEDs 9*a* and 9*f* at the ends are disposed, inwardly toward the light guide plate 7 so as to form the bent portions 11*c*. The top-emitting type LEDs 9 are connected to connecting terminals 17 of an FPC 22 having flexibility by solder 18, for example, and are thereafter disposed on the side wall surface 11*a* by bonding the FPC 22 to the side wall surface 11*a* and the bent portions 11*c* such that the LED 9*a* at the end is positioned in the bent portion 11*c*.

The bent portions 11*c* may also be formed by bonding the FPC 22 having a plurality of LEDs 9 mounted thereon to the side wall surface 11*a* that has incisions in portions at the ends, and by thereafter bending the portions of the side wall surface 11*a* having the incisions together with the FPC 22 toward the center of the display region 13 at a prescribed angle, thereby making the LEDs 9*a* and 9*f* at the ends located in the bent portions 11*c* inclined. Alternatively, instead of using the FPC 22, the LEDs 9 at the ends and the other LEDs 9 may be respectively mounted on different circuit boards 10, and the different circuit boards 10 may be separately disposed on the side wall surface 11*a* and on the bent portions 11*c*.

Figure 7:
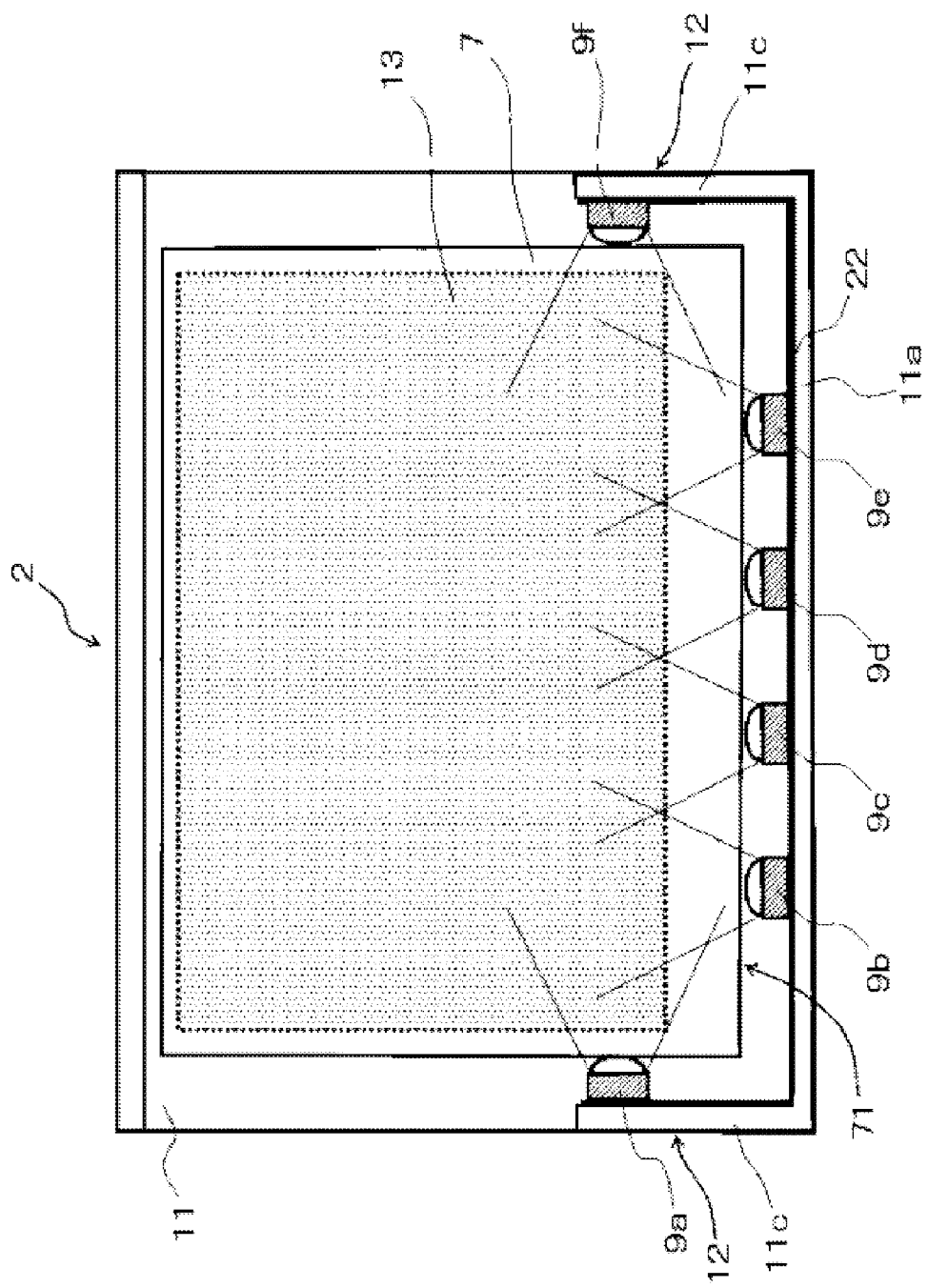
FIG. 7 is a plan view for illustrating a modification example of the backlight device of Embodiment 2.
Figure 8:
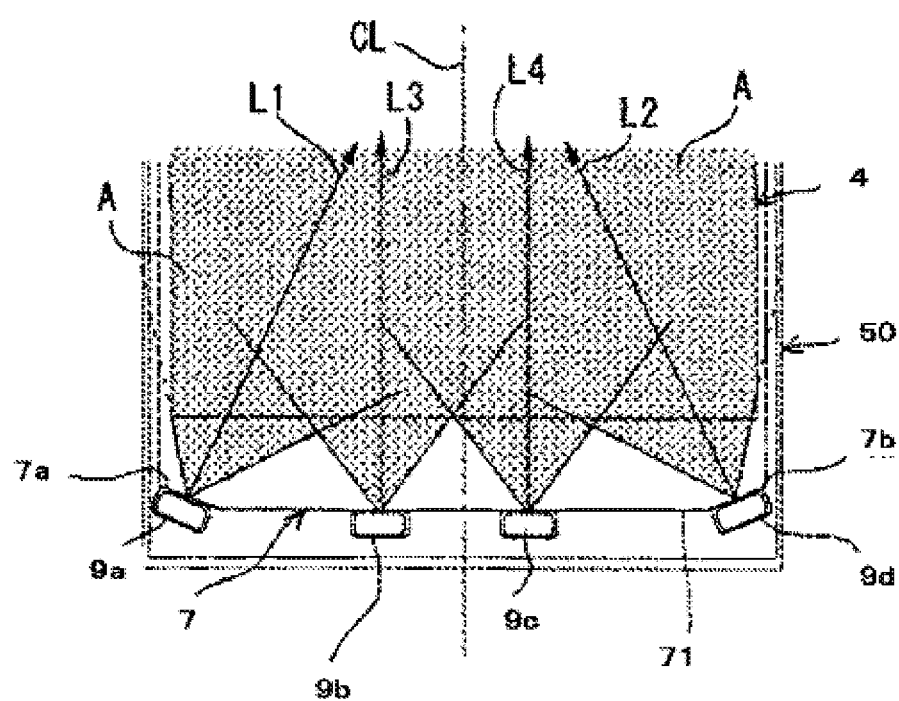
FIG. 8 is a plan view of a conventional backlight device for a liquid crystal display element.
Figure 9A:
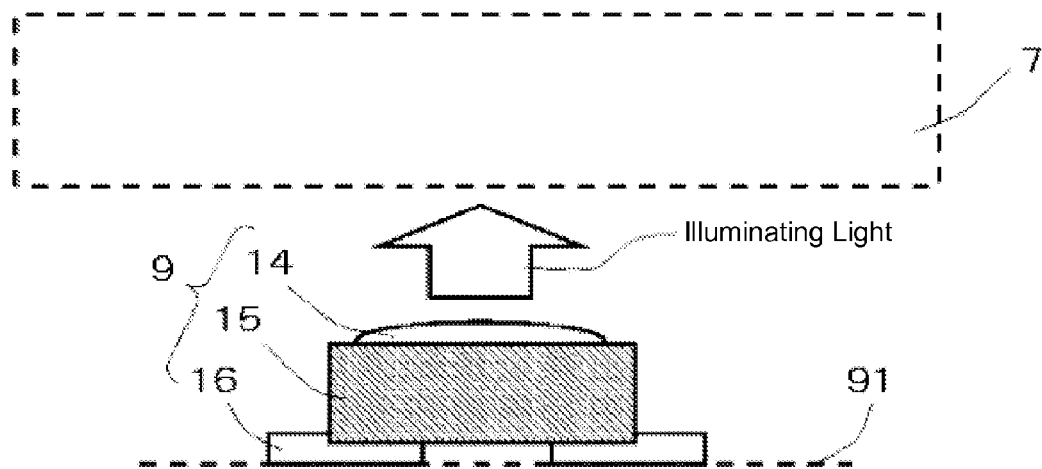
FIG. 9a is a side view for illustrating chip-type LEDs of a top-emitting type and a side-emitting type.
Figure 9B:
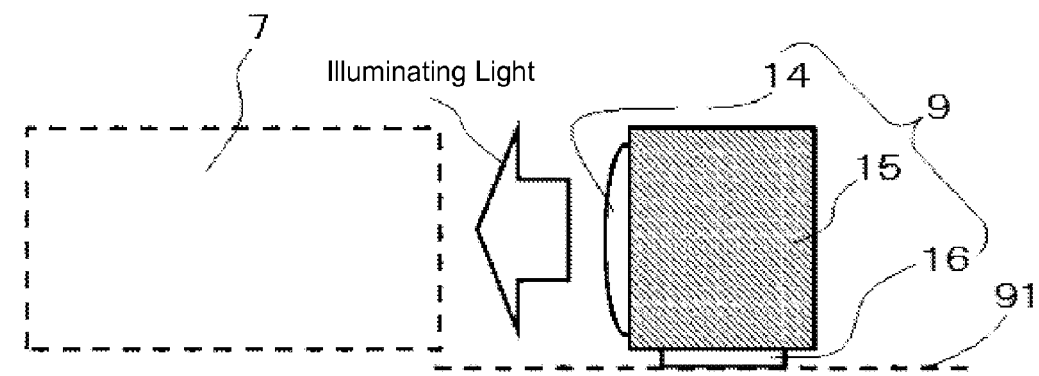
FIG. 9b is a side view for illustrating chip-type LEDs of a top-emitting type and a side-emitting type.

In this embodiment, because the tilt angle of the tilting portion 12 is set by the bending angle of the bent portion 11*c* provided in the side wall surface 11*a* of the outer case 11, the tilt angle of the LEDs 9*a* and 9*f* at the ends can be made greater. As shown in FIG. 7, for example, it is possible to bend the bent portions 11*c*, which are the tilting portions 12, at 90° such that the illumination directions of the LEDs 9*a* and 9*f* at the ends intersect with the illumination direction of the other LEDs 9*b* to 9*e* at a right angle.

In an area of the display region 13 near the light incident surface 71, for example, uneven brightness with brighter areas and darker areas may occur in the arrangement direction of the LEDs 9*b* to 9*e* due to the illuminating light from the LEDs 9*b* to 9*e* adjacent to each other overlapping in some areas and not overlapping in the other areas. However, as described above, with the tilting portions 12, the illumination directions of the LEDs 9*a* and 9*f* at the ends can be made to intersect with the illumination direction of the other LEDs 9*b* to 9*e* at a right angle, and the illuminating light from the LEDs 9*a* and 9*f* at the ends is thereby emitted in a direction that crosses the brighter and darker areas that cause uneven brightness. This way, the entire area with the uneven brightness is illuminated and becomes brighter, thereby suppressing the uneven brightness.

In Embodiment 2, the bent portions 11*c*, which are the tilting portions 12, are formed by using a portion of the outer case 11. The outer case 11 is made of a metal plate and therefore dissipates heat effectively, and because heat generated by the LEDs 9 in emitting light is transmitted throughout the entire outer case 11, and is dissipated effectively, the thermal deterioration of LEDs 9 can be prevented, allowing for a further improvement of life thereof.

Embodiments 1 and 2 have been described above, however, the present invention is not limited to the embodiments above, and various modifications can be made without departing from the scope of the present invention. In the backlight device 2 of Embodiment 1 shown in FIG. 3, for example, it is also possible to form cut-out portions in the light incident surface 71 where it faces the LEDs 9a and 9f at the ends, which are inclined, such that the LEDs 9 and the light guide plate 7 can be made closer to each other and a frame portion can be thereby made narrower.

Although the backlight device 2 shown in FIGS. 5 and 7 is configured such that the light guide plate 7 and the LEDs 9 are disposed close to each other, thereby achieving the narrower frame, it is also possible to dispose the light guide plate 7 and the LEDs 9 so as to be further away from each other. When the distance between the light guide plate 7 and the LEDs 9 is increased, the frame portion becomes larger, but it becomes possible to suppress the uneven brightness with brighter and darker areas, which occurs near the light incident surface 71 of the light guide plate 7.

The tilting portions 12 described in Embodiments 1 and 2 may be provided for a plurality of LEDs 9 disposed at the end, respectively. In Embodiments shown in FIGS. 3 and 5, for example, the tilting portions 12 can also be provided for the LED 9a and the LED 9b in the end portion, respectively, such that the illumination directions thereof cross the illumination direction of the other LEDs 9c and 9d in the center, thereby achieving the further efficient light illumination.

In the embodiment shown in FIG. 5, a single titling portion 12 may be provided for a plurality of LEDs 9 in the end portion. By disposing the LEDs 9a and 9b at the end on the same tilting portion 12, for example, the illumination directions thereof can be made to cross the illumination direction of the other LEDs 9c and 9d in the center, thereby achieving the further efficient light illumination.

DESCRIPTIONS OF REFERENCE CHARACTERS 1 liquid crystal display device
2 backlight device
3 liquid crystal panel
4 diffusion sheet
5 prism sheet
6 polarizing sheet
7 light guide plate
7a, 7b inclined surface
8 reflective sheet
9, 9a, 9b, 9c, 9d, 9e, 9f chip-type LED
10 substrate
11 outer case
11a side wall surface
11b incision
11c bent portion
12 tilting portion
13 display region
14 light-emitting surface
15 package
16, 17 connecting terminal
18 solder
19 protrusion
20 relay terminal
21 conducting portion
22 FPC
71 light incident surface
72 light emerging face
91 mounting surface

The invention claimed is:

1. A backlight device, comprising:
a light guide plate that emits, from a top surface thereof, light that entered from a side surface thereof;
a substrate that is disposed at the side surface of the light guide plate and that has a plurality of top-emitting LEDs arranged thereon; and
an outer case that encloses the light guide plate and the substrate,
wherein, of the plurality of LEDs, an LED at an end is provided with a tilting portion that makes an illumination direction thereof cross an illumination direction of other LEDs, and
wherein the tilting portion is provided by connecting the LED at the end to the substrate through a relay terminal that has an inclined top surface.

2. The backlight device according to claim 1, wherein a light incident surface of the light guide plate has an inclined surface that is perpendicular to an illumination direction of the LED provided with the tilting portion.

3. A light crystal display device, comprising the backlight device according to claim 1.

* * * * *